United States Patent Office
3,520,612
Patented July 14, 1970

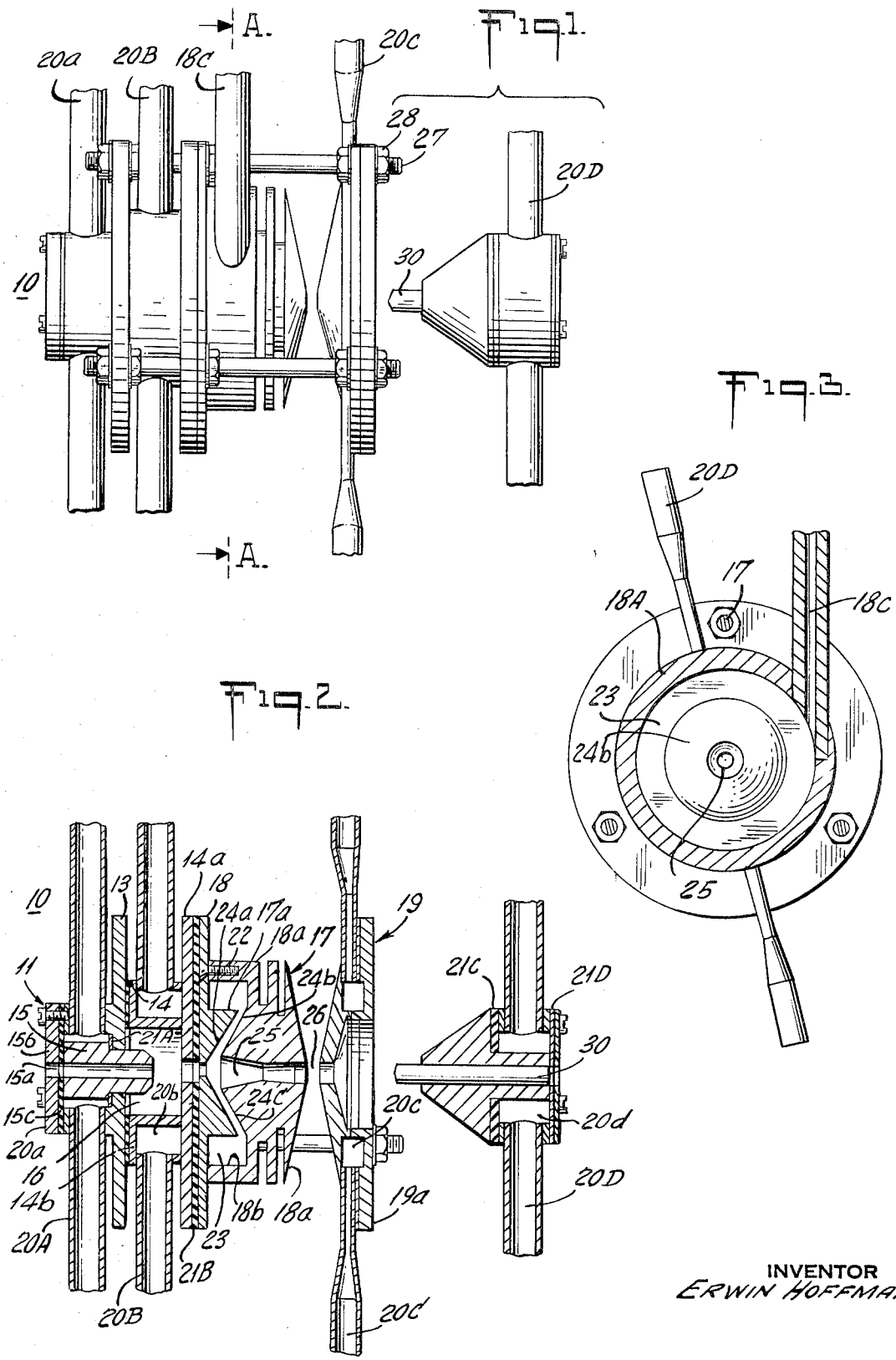

3,520,612
DEVICE FOR INTRODUCTION OF AEROSOLS INTO DIRECT CURRENT ARC
Erwin Hoffmann, Berlin, Germany, assignor to Deutsche Akademie der Wissenschaften zu Berlin, Berlin-Adlershof, Germany
Filed Apr. 11, 1966, Ser. No. 541,664
Int. Cl. H01j 17/26, 61/28
U.S. Cl. 356—86          8 Claims

ABSTRACT OF THE DISCLOSURE

The device comprises an aerosol injector unit disposed between the anode and an arc stabilizing disc. The injector unit consists of a central passage for the arc and of an annular conduit surrounding the passage. The annular conduit has at its outer periphery a tangentially directed inlet for the aerosol stream to be analyzed, and its inner periphery is provided with a conical nozzle communicating with the central passage for whirling said stream while introducing the same tangentially into the arc.

---

The invention relates to a device for introducing aerosols into a direct current arc for the purpose of solution analysis.

The continuous introduction of aerosols into a plasma for the purpose of solution analysis is almost exclusively done by means of flame photometry. The introduction of aerosols into a direct current shows advantages over the flame photometry. With this method, because of the high temperatures which are present in the arc, it becomes possible to analyze, for instance, elements which are difficult to stimulate otherwise.

Devices are known to introduce aerosols into a direct current arc, in which the light emission between the electrodes is used for analysis purposes. In one device, the aerosol is axially sprayed through the anode into a chamber. For stabilization purposes, a second oriented gas current is tangentially introduced into the same chamber. The arc is formed through the opening in a disc, and the disc, as well as the anode, are water-cooled. The cathode is located outside of this arrangement. The observation takes place between the cathode and the disc.

In another known device, the arc is stabilized by three discs. The aerosol is radially introduced by a plurality of channels which are symmetrically arranged in one of the three discs. The discs are water-cooled and the observation takes place between two discs.

Both devices have certain shortcomings, for instance, in the first mentioned device two gas currents are required, one for introducing the aerosol into the arc, and a second for holding the arc in its path, because it has a tendency to drift away from the cold gas current. By employing two gas currents, the operation becomes complicated and as a consequence, it is subject to faults. In the latter described embodiment, a settling of the solution, or the residue therefrom in the channels results in an unsymmetric gas supply, which in turn leads to an unstable burning after a long operating time. In addition, the gas flow is limited, so that customary sprayers cannot be employed.

It is, therefore, an object of the invention to provide an improved device capable of sustaining a disturbance free, stable burning of a direct current arc over a longer period of time, and thereby enlarging the applicability of said arc for the purpose of solution analysis.

It is a further object of the invention to provide a device capable of introducing aerosols into the direct current arc in an even fashion and without exposing the arc to impurities.

With these objects in view, the invention provides in a device, an anode chamber, an outer stabilizing disc, and an injector unit having an injection chamber consisting of an injection disc and a counter disc arranged therebetween, the injection disc forming an annular space with the counter disc to which space a supply conduit is coupled in a tangential fashion for the introduction of the aerosol thereinto. A center portion of the injection disc is formed as an outwardly projecting conical surface, and a center portion of the counter disc is formed as an inwardly projecting conical surface and cooperates with the conical surface of the injection disc in such a manner that a conical gap is formed therebetween the cone of which is directed against a plasma stream. The annular space and the conical gap are in communication and form a unitary chamber.

In accordance with the invention, the axial passage for the direct current arc is enlarged at the injection disc to form a whirl chamber which tapers off in the direction of the current flow. The annular space, as well as the walls of the conical gap, and the whirl chamber will be kept at a temperature of more than 100° C. The direct current arc is stabilized when guided through the discs. The anode chamber and the stabilizing disc are water cooled. An observation gap is formed between the outer stabilizing disc and the injection disc.

Due to the introduction of the aerosol in the annular fashion in accordance with the invention, a uniform introduction of a substance in the arc is attained and arc stability is also achieved. Due to the inventive arrangement of the conical gap a good mixing of the plasma with the aerosol is attained. The temperature of the injection chamber is such as to prevent condensing of the aerosol on the walls, and is effective to keep the arc free from impurities and stabilized. The device renders it possible to use a customary sprayer for the flame photometer when argon is used for the arc.

In the following the invention will be fully described in an example, but it should be understood that it is given by way of illustration and not limitation and that many changes in details can be made without departing from the spirit of the invention.

FIG. 1 is a side view of the inventive device;
FIG. 2 is a longitudinal section of the device of FIG. 1; and
FIG. 3 is a section along line A—A through the injection disc according to FIG. 1.

With reference to FIGS. 1 and 2 of the drawings, it is seen that the apparatus of the subject invention includes a plurality of axially arranged disc members of which anode unit 11 includes anode 15. Anode 15 is a unitary cylindrical anode with a passage 15a centrally located therethrough. Anode 15 is adapted to be held at a potential necessary to sustain an electric arc with a cathode unit 12 displaced axially therefrom. The source of potential for energizing the device is not shown in the drawing and might be a source conventionally used to sustain a direct current arc. Anode unit 11 further includes a manifold system 20A which introduces cooling media, such as cooling water, into a chamber 20a surrounding the anode 15. Anode unit 11 also includes an anode disc member 13 insulatably supported from cooling chamber 20a by an insulating gasket 21A and integrally connects the anode unit with the remaining parts of the device in a manner hereinafter described. Anode 15 extends into a chamber disc 14 which has a flange like connecting portion 14a at one side thereof and a flange like wall portion 14b formed at the other side thereof to connect with another flange 13 of anode unit 11. The anode chamber disc 14 has also a manifold system 20B connected thereto for introducing cooling media, such as water, into a cooling chamber 20b surrounding the anode chamber 16. A further insulating gasket 21B separates flange 14a from ejection unit 17 which includes two disc members, a connecting disc member 18 integrally coupling the injector unit to the anode unit 11, and an injector disc 18A coupled to the connecting disc member by a plurality of bolts 22. Injector disc 18A is formed with a plurality of fin like projections 18a thereon which are correlated with the temperature requirements of the hereinafter described internal chambers of the injector unit. Injector disc 18A has a cylindrical form and is arranged so with respect to connecting disc 18 that an annular conduit 23 is formed between a wall portion 18b and a cylindrical projection 17a of the connecting disc 18. A central portion of injector disc 18A is shaped into a projecting conical surface 24b projecting in the direction of the anode 15, which conical surface 24b cooperates with a conically formed recess 24a in the central portion of connecting disc 18. The aforementioned two conical surfaces 24a and 24b are spaced to form a frustoconical chamber 24c therebetween which at the outer edges thereof communicates with annular conduit 23. Chamber flange 14a has a central aperture formed therein which communicates with the anode chamber, through an aperture formed in the insulating gasket 21B, and through an aperture formed in the central recessed portion of connecting disc member 18 with an axial passage through injector unit 17. Injector disc 18A, at the conically formed side 24b thereof adjacent the cooperating conical surface 24a of the connecting disc member 18, has the axial central conduit enlarged to form a whirl chamber 25 which tapers off in the direction of the plasma flow, i.e. away from the conical surface 24a of the connecting disc 18. An injector inlet conduit 18C is tangentially coupled to annular conduit 23 so that the aerosol might be introduced tangentially, as shown in FIG. 3, into the frustoconical chamber 24c whereby the injected substance will come into contact with the arc passing through the axial central conduit in a uniform manner by whirling around its outer surface. As pointed out above, such manner of introduction of the substance through injector conduit 18C will result in an arc which will not be interrupted on account of coming into contact with the jet of the injected substance in a non-uniform manner, as it is the case in the devices heretofore known. The construction of the injector unit 17 is such that the aerosol introduced through injector conduit 18C will not condense on the walls of annular space 23 or on the walls of conical gap 24c, whereby the aforementioned passages remain free from residues which circumstance leads to a constant flow of the introduced fluid and to a uniform engagement thereof with the plasma. Displaced at a predetermined distance from injector unit 17 is an outer stabilizing disc 19 having a centrally formed aperture therethrough co-axial with the aperture through the injector unit 18. Stabilizing disc 19 serves to control the arc and stabilize its characteristics in a known manner. Stabilizing disc 19 also has a manifold system 20C associated therewith which supplies cooling media to the cooling chamber 20c surrounding the plasma. A cathode unit 12 is axially spaced and movable with respect to outer stabilizer disc 19 so that by an appropriate positioning of cathode unit 12, an arc is drawn through the axial passage heretofore described as being formed through the disc units placed between the anode unit 11 and outer stabilizing disc 19. The cathode unit may be of a suitable construction which permits the drawing of a direct current arc through the aforementioned passage. Cathode unit 12 has also associated therewith a manifold system 20D for supplying cooling fluid to a chamber 20d surrounding the cathode 30. The cooling manifold system is insulated from the body of the cathode through insulating gaskets 21C and 21D. In a preferred embodiment of the invention, a wolfram rod has been used successfully for cathode 30. The aforementioned disc members are joined together by passing a bolt 27 through apertures in the respective flanges 13, 14a and 19a. The distance of outer stabilizing disc 19 with respect to the injector unit 17 may be varied to form a variable gap 26 therebetween which gap may be used for observation purposes during the spectro-analysis process. The gap 26 may be varied by adjusting the position of spacing nuts 28 on threaded bolt 27.

It is seen that the invention provides a novel device for introducing aerosols into a direct current arc in a manner permitting the possibility of the introduced substance to come into contact with the arc surface in a uniform manner and substantially around its complete circumference, since the inventive device imparts a whirling to the introduced substance by the novel structural features of the injector unit.

The device as pointed out above is capable to sustain a direct current arc and introduce the substances such that no clogging of the injecting passages takes place, since formation of the residues which would acuse breakdown and non-homogenous introduction of the substances into the arc is prevented.

Although the invention has been described with reference to a specific embodiment thereof, it is not intended that the invention should be limited to such specific embodiments only, but it should be defined by the scope of the appended claims.

The passage 15a which is centrally located through the anode 15 will be used for igniting the direct current arc. An ignition wire will be passed through the said passage 15a up to the cathode. After forming the arc between the cathode and the ignition wire the arc will be moved to the anode 15.

The terminals can be connected with anode and cathode in a known manner, e.g. with screws.

The direct current arc is stabilized in known manner by stabilizing discs having centrally located apertures. In that way the arc is forced in a path through the said apertures.

What is claimed is:

1. In a device for introducing aerosols of chemical substances into a direct current arc for spectrum analysis of the chemical substances, an anode unit, a cathode unit in spaced circuit relationship with said anode unit for establishing a direct current arc therebetween, an aerosol injector unit disposed between said anode and cathode units for injecting an aerosol substance into the arc established between said anode and cathode units, said injector unit comprising a central conduit means extending axially with a section of said arc, annular conduit means coaxially surrounding said central conduit means, an inlet conduit disposed at the outer periphery of said annular conduit means for tangentially introducing a stream of said aerosols therein, wall means forming a frustoconical chamber of annular cross-section communicating at the bottom annulus thereof with the inner periphery of said annular conduit means and tapering in counter direction to the plasma flow of said arc to communicate at the top annulus thereof with a peripheral section of said central conduit means, thus causing said aerosol stream to whirl around said arc which coming into engagement therewith.

2. The combination as claimed in claim 1 wherein said aerosol injector unit comprises a connecting disc member for coupling said injector unit to said anode unit, and an injector disc member coupled to said connecting disc member to form said central conduit means, said annular conduit means and said frustoconical chamber therebetween.

3. The combination as claimed in claim 2, further comprising an outer stabilizing disc member surrounding said arc and disposed between said cathode unit and said injector unit and having an aperture therethrough aligned with the central aperture in said injector unit for passing the arc therethrough.

4. The combination as claimed in claim 2, wherein said injector disc memember in said injector unit is shaped to form a whirl chamber surrounding said central conduit, said whirl chamber being conically shaped with wall portions thereof tapering in the direction of said direct current flow.

5. The combination as claimed in claim 3, wherein said outer stabilizing disc member has a cooling system for conveying cooling media to a cooling chamber in proximity of said direct current arc.

6. The combination as claimed in claim 4, wherein said injector unit has cooling means formed thereon.

7. The combination as claimed in claim 3, including means for integrally connecting said anode unit, injector unit and said outer stabilizing disc member.

8. The combination as claimed in claim 3, including means for adjusting the position of said outer stabilizing disc member with respect to said injector unit thereby to form a variable gap therebetween.

References Cited

UNITED STATES PATENTS 3,319,097    5/1967    Giannini et al. _____ 315—111 X

OTHER REFERENCES

Margoshes et al.: "A Study of the Gas-Stabilized Arc as an Emission Source for the Measurement of Oscillator Strengths. Determination of Some Relative gf-Values for Fe I." Journal of Research of the National Bureau of Standards, vol. 67a, No. 6, November-December 1963, p. 562.

Riemann: "Die Messung von relativen und absoluten optischen Ubergangswahrscheinlichkeiten des CuI im wandstabilisierten Lichtbogen." Zeitschrift fur Physik 179, 1964, pp. 38–51.

ROY LAKE, Primary Examiner

F. L. EVANS, Assistant Examiner

U.S. Cl. X.R.

313—231, 315—111